United States Patent
Armstrong et al.

[15] 3,695,126
[45] Oct. 3, 1972

[54] INDEXABLE TURRET TOOL POST

[72] Inventors: Bruce M. Armstrong, Williams Bay, Wis.; Jack M. Butler, Mount Prospect, Ill.

[73] Assignee: Armstrong Bros. Tool Co., Chicago, Ill.

[22] Filed: May 18, 1970

[21] Appl. No.: 38,180

[52] U.S. Cl. .................................................82/36 A
[51] Int. Cl. ...........................................B23b 29/24
[58] Field of Search.....82/36 A; 74/813, 813 L, 816, 74/826

[56] References Cited

UNITED STATES PATENTS

| 3,088,351 | 5/1963 | Schardt | 82/36 A |
| 2,547,616 | 4/1951 | Beekman | 74/826 X |
| 2,373,535 | 4/1945 | Brown | 82/36 A |

FOREIGN PATENTS OR APPLICATIONS

| 836,838 | 6/1960 | Great Britain | 82/36 A |

*Primary Examiner*—Leonidas Vlachos
*Attorney*—Wolfe, Hubbard, Leydig, Voit & Osann, Ltd.

[57] ABSTRACT

An indexable turret tool post is provided, in which a plurality of index pins situated around a central tool post bolt are provided. To rotate the tool block and to lock the tool block into position on the index pins, nestable cam means are included.

3 Claims, 5 Drawing Figures

PATENTED OCT 3 1972

INVENTORS
BRUCE M ARMSTRONG
JACK M BUTLER by: Wolfe, Hubbard,
Leydig, Voit + Osann
ATTYS.

PATENTED OCT 3 1972 3,695,126
SHEET 2 OF 2
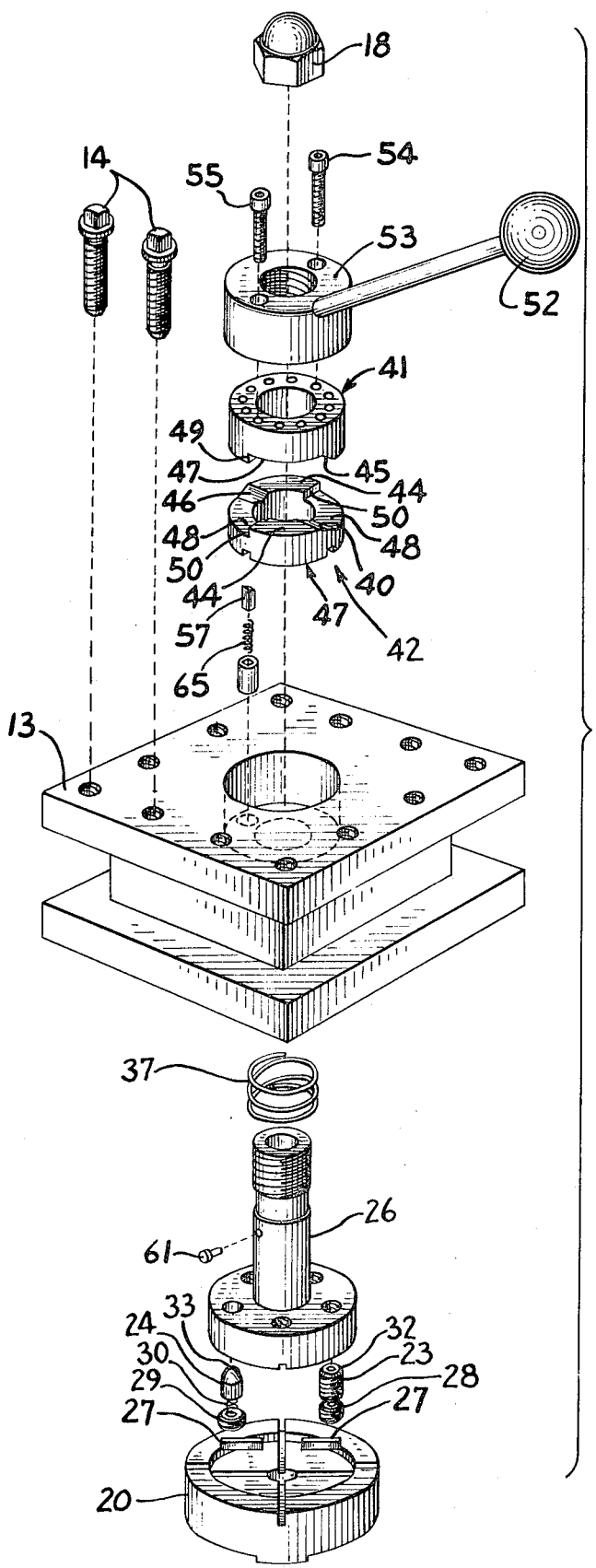
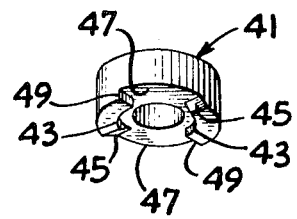
FIG. 4
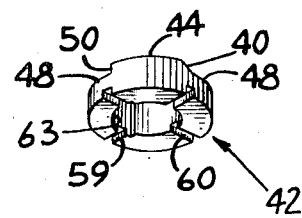
FIG. 5
FIG. 3
INVENTORS
BRUCE M. ARMSTRONG
JACK M. BUTLER
by: Wolfe, Hubbard,
Leydig, Voit & Osann
ATTYS.

INDEXABLE TURRET TOOL POST

This invention relates generally to machine tools, and more particularly concerns an indexable turret tool post wherein a tool-holding block can be unlocked from a given operating position and rotated to another position.

The rapid and precise location of tool bits in appropriate operating positions on machine tools has long presented difficulties for machine tool designers. Operating requirements of the machine tools necessitate that the tool bits be quickly, easily, and precisely located in operating positions, and yet be quickly and easily swung away or otherwise moved out of the operating position so that another machine tool bit can be moved into the operating position, or so that other operations can take place. The tool bit mounting mechanisms must, moreover, be easy and inexpensive to make and must be capable of easy repair. Indexable machine tool posts of the hand-operated variety have, in the past, been more numerous than successful in meeting the above difficulties.

It is therefore an object of this invention to provide an indexable turret tool post for carrying machine tool bits wherein the bits can be quickly and easily rotated into and away from a precisely located operating position.

It is a further object of the invention to provide an indexable turret tool post which is reliable and rugged in its design and which is simple and inexpensive to maintain.

Other objects and advantages of the invention will become apparent upon reading the following detailed description and upon reference to the drawings, in which:

FIG. 3 is an exploded view of the indexable turret tool post of FIG. 1;

FIG. 4 is a bottom perspective view of the upper cam member in the indexable turret tool post of FIG. 1; and FIG. 5 is a bottom perspective view of the lower cam member in the indexable turret tool post of FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention.

Figure 1:
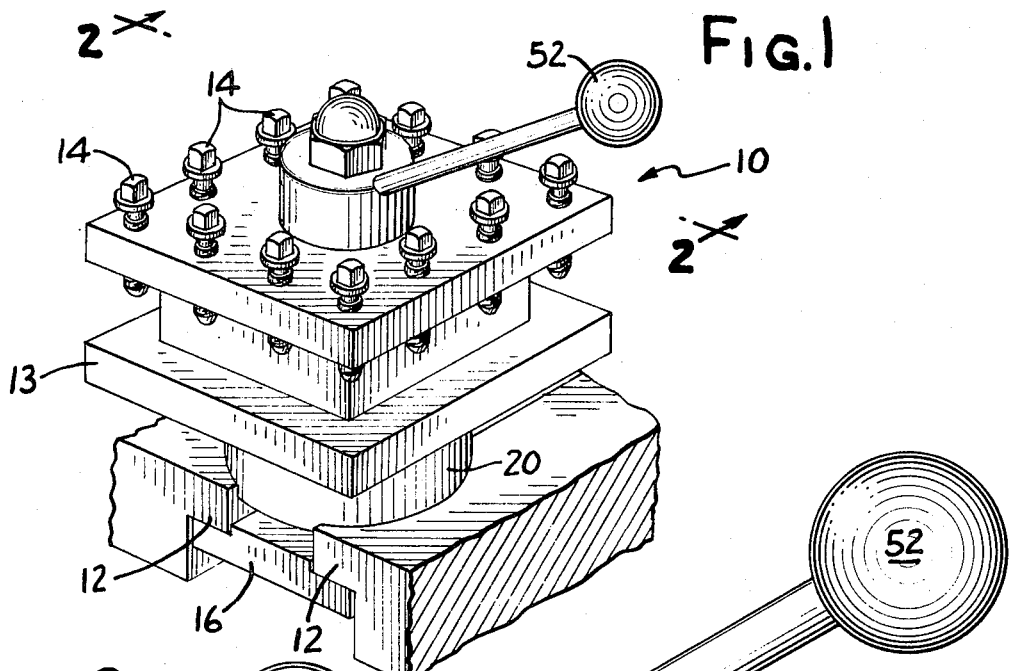
FIG. 1 is an overall perspective view showing the general form and arrangement of an indexable turret tool post embodying the invention.
Figure 2:
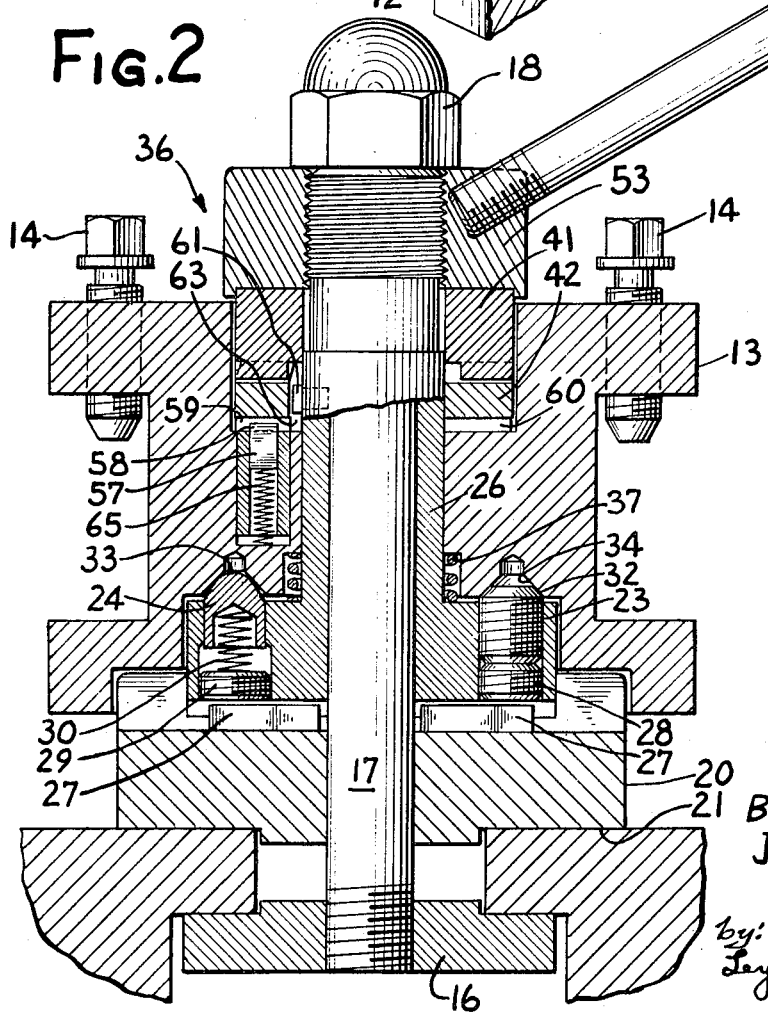
FIG. 2 is an enlarged sectional view taken along line 2—2 of FIG. 1.

Turning first to FIGS. 1 and 2, there is shown an indexable turret tool post 10 mounted upon a portion 12 of a machine tool. In the illustrated embodiment of the invention, a tool block 13 is provided for carrying various machine tool bits, or tool holders (not shown) held by set screws 14. The turret tool post 10 is clamped to the machine tool 12 by means of a T-slot bolt head 16 or otherwise secured to a center post bolt 17; clamping action is provided by a top nut 18.

A base plate 20 is included for mounting the tool post 10 on the machine tool 12. It is a feature of the invention that the base plate 20 is separable from the other parts of the tool post 10, thereby permitting its easy removal or replacement. It is another feature of the invention that the base plate member 20 is formed in a manner such that the bottom surface 21 may be easily machined or cut off so that the plate 20 may be reduced to a desired thickness. By so reducing the thickness of the base plate 20, the effective height of the turret tool post may be reduced, thereby lowering the effective position of the tool block 13 and tool bits.

It is often desirable to temporarily change the effective height of such tool posts when moving a post from one metal working machine to another, and in other situations. For this reason, the invention contemplates that a base plate 20 of any given height may be thus removed from the tool post assembly 10, and another base plate 20 of differing height substituted in place of the first, thereby permitting the effective height of the tool post to be conveniently altered.

For preliminary guiding the installed tool block 13 into a desired predetermined operating position on a machine tool, an index pin mechanism is provided. This mechanism includes a plurality of fixed index pins 23 and at least one resilient index pin 24, which may be spring loaded as illustrated. In the illustrated embodiment of the invention, four fixed index pins 23 and a single resilient index pin 24 are included, so as to provide five points of registration for the rotatable tool block 13 upon the fixed base 20. The pins are retained upon and protrude from the base through a center post or collar member 26, which collar member 26 is fixedly keyed against rotation relative to the base plate 20 by keys 27. The collar 26 is also seated within a central recess or cavity in the plate 20 for stability.

For the purpose of adjusting the height of the index pins in the illustrated embodiment of the invention, the fixed index pins 23 are provided with set screws 28; the resilient pin 24 is provided with a spring pressure adjusting screw 29. In the illustrated embodiment, the threaded fixed index pins 23 may be turned upwardly or downwardly to a desired height. Thereafter the set screws 28 may be forced into engagement with the fixed index pins 23 so as to lock or secure the fixed pins 23 in the desired location. In the case of the resilient spring index pin 24, the set screw 29 is used to adjust the biasing force exerted upon the biased index pin by the biasing spring 30. The axes of the pins are, as illustrated, oriented in a direction generally parallel to the axis of the center post bolt 17, and collar 26.

For engaging and guiding the tool block 13 into the locked and tool bit operative position illustrated, the protruding tips 32, 33 of the index pins 23, 24 engage in index indents 34, the indents 34 being machined or otherwise formed in the tool block 13.

In operation, when it is desired to rotate the tool block 13 to another position angularly spaced from an original position, a locking means 36 hereinafter described is released. Upon such release, a tool block biasing spring 37 urges the tool block 13 away from the base members 20 and 26, thus lifting the block 13 clear of the tips 32 of the fixed index pins 23. The tip 33 of the resilient index pin 24 remains, however, in contact with the index indents 34 in block 13 and contacts successive indents 34 as the block 13 is rotated into the newly selected operation position. When the selected position is reached, the contacting resilient index pin serves to preliminarily locate the tool block in its proper position by preliminarily engaging the appropriate indent 34. The locking mechanism 36 may now be again actuated, urging tool block 13 downwardly along the center post collar 26 and into positive engagement with the remaining index pins, thereby precisely locating the tool block 13 in a proper new operating position.

The locking means 36 is provided, in further accordance with the invention, for urging the block member 13 against the biasing spring 37 into any one of a plurality of angularly spaced predetermined operating positions. In the illustrated embodiment of the invention the locking means 36 includes mutually engaging mating cam members 41 and 42 mounted for rotation about the center post collar 26. As best illustrated in FIGS. 3, 4 and 5, each cam member is provided with high locking steps 43, 44 inclined ramp portions 45, 46 recessed portions 47, 48 and stop face portions 49, 50.

In operation of the illustrated embodiment, the upper cam member 41 may be rotated by the machine operator's rotation of the operating handle 52 and the handle nut 53 secured thereto. The upper cam member 41 is secured to the operating handle nut 53 by any convenient means such as illustrated screws 54, 55.

When the upper cam member 41 is rotated in a given direction (as illustrated here, in a clockwise direction) with respect to the lower cam member 42, the high locking steps 43 and 44 of the cam members are relatively engaged. Such engagement forces the cam members 41 and 42 relatively apart from one another, thereby urging the lower cam member 42 and associated block 13 relatively downward on the center post collar 26, and urging the tool block member into a fixed operating position, as described above.

When, however, the upper cam member is rotated in the opposite (here counterclockwise) direction, the high locking step 43 of the upper cam member is released from the high locking step 44 of the lower cam member 42, and the cam members are mutually nested, the high locking steps 43 of the upper cam member engaging the recessed portions 48 of the lower cam member, and the high locking steps 44 of the lower cam member engaging the recessed portions 47 of the upper cam member. The tool block 13 is thus released upwardly, and is free to rotate into a new operating position.

As illustrated here, locking motion is accomplished by rotating the upper cam member 41 in a clockwise direction. It will be understood that by other appropriate formation of the cam surfaces 43–50 upon the cam members 41 and 42, the locking motion could be caused by rotating the upper cam member in a counterclockwise direction.

It is a feature of the invention that rotation of the operating handle 52 serves not only to unlock the tool block member 13 but also to rotate the block 13 to a new operating position. To this end, and in accordance with the invention, a beveled pawl member 57 is resiliently mounted upon the block member 13. The beveled tip 58 of the pawl member 57 is positioned so as to engage one of a plurality of slots 59, 60 formed in the bottom of the lower cam member 42.

A stop pin member 61 mounted upon the center post 26 fits into a recessed arctuate slot 63 formed in the inner base of the lower cam member 42; the slot is formed over 90° of arc within the cam member 42, so that the cam member 42 is capable of only 90° of rotation upon the center post 26.

When the unlocking mechanism is operated as described above and the operating handle 52 is further traversed, the vertical stop faces 49 and 50 of the respective upper and lower cam members 41 and 42 engage, causing both cam members to rotate about the center post collar 26 as a unit. The beveled pawl member 57, biased into the slot 59 in the lower cam member by the pawl biasing spring 65, thus causes the pawl member 57 and the tool block 13, which retains the pawl member 57, to rotate with the rotating cam members 41 and 42.

When the desired new operating position is reached, the machine tool operator rotates the operating handle 52 in the opposite direction. The beveled pawl member 57 is then forced, by virtue of its beveled formation, out of the slot 59 and allows the rotating lower cam member 42 to rotate back to substantially its original position. When the original position is reached, the stop pin 61 prevents further rotation of the lower cam member 42, and further rotation of the operating handle 52 urges the upper cam member 41 over the ramp portions and into such position that the high locking steps 43 and 44 are once again engaged, thereby urging the tool block 13 downward into its new position.

Thus, an indexable turret tool post is provided which is simple in design and which may be easily operated to move a machine tool bit from an operating position to another preselected position without difficulty by the operator.

We claim as our invention:

1. An indexable turret tool post assembly for mounting at least one cutting tool bit or the like upon a machine tool, comprising in combination, a center bolt, a T-slot bolt head secured at one end to said center bolt for engagement with said machine tool, a base plate removably mounted on said center bolt for engagement with said machine tool, a substantially T-shaped center post having an upstanding collar portion and an outwardly extending radial flange portion, said T-shaped center post being mounted on said center bolt with said flange portion in close relation to said base plate, means between the said flange portion and said base plate for preventing relative rotational movement, means for clamping said bolt head, base plate and center post on said machine tool to form a fixed support unit, said base plate having a predetermined thickness for establishing a preset effective height of the turret tool post and being selectively removable from said center bolt for replacement by a base plate of a different thickness to alter the effective height of said turret tool post, a block member rotatably mounted on said center post for carrying a cutter tool bit, indexing means on said flange portion and said block member for guiding said block member into any one of a plurality of angularly spaced predetermined operating positions on the center post, and locking means for locking the block member into one of said predetermined operating positions.

2. An indexable turret tool post according to claim 1 wherein said indexing means includes a plurality of indexing pins mounted in an upper side of said center post flange portion, at least one of said indexing pins being resiliently mounted in said flange portion, said block having an underside surface formed with recesses for receiving said indexing pins, said locking means including mutually engaging mating cam members rotatable about said center post, said cam members each having mutually engageable high locking step portions, mutually engageable inclined ramp portions, mutually engageable recessed portions and mutually engageable stop face portions, whereby when one cam member is rotated in a given direction with respect to another cam member the cam members are forced apart from one another and when said one cam member is rotated in the opposite direction the cam members may become mutually locked together for unitary and mutual rotation about said center post.

3. An indexable turret tool post according to claim 2 including a vertically movable spring biased pawl member mounted in said block member, one of said cam members having an underside surface formed with a plurality of slots for individually receiving said pawl member, said pawl member being capable of preventing relative rotational movement in one direction between said slotted cam member and said block member while permitting relative rotational movement in the opposite direction, and a stop member disposed between said center post and said slotted cam member for limiting the rotational travel of said cam member relative to said center post.

* * * * *